No. 653,901. Patented July 17, 1900.
T. J. BRAY.
BAR FOR FORMING WELDED RINGS.
(Application filed Oct. 14, 1899.)
(No Model.)
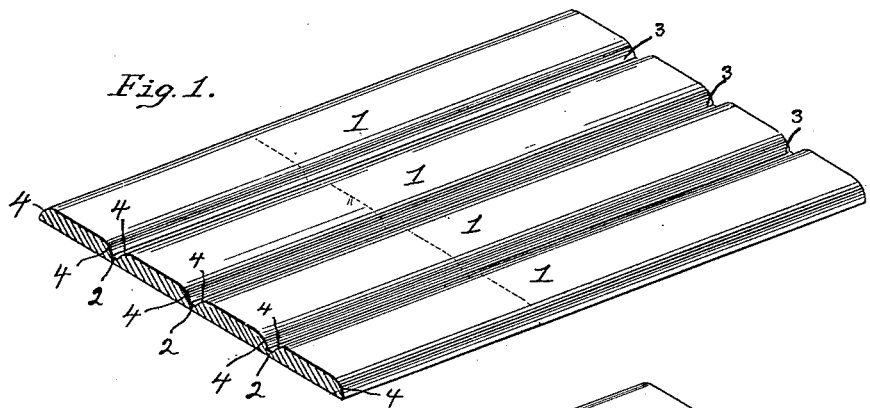
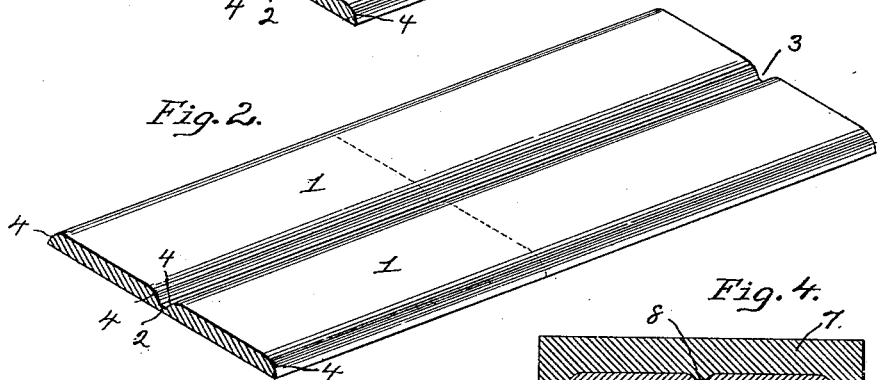
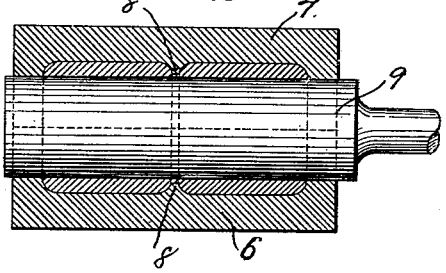
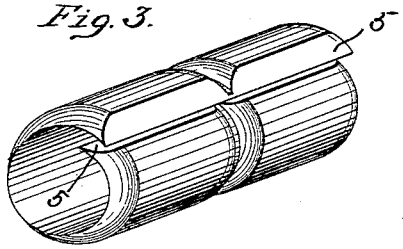
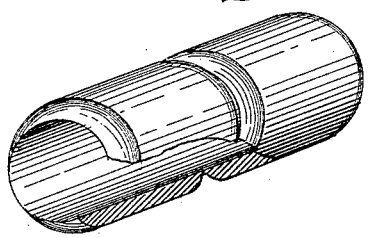
Witnesses:
Inventor:

UNITED STATES PATENT OFFICE.

THOMAS J. BRAY, OF PITTSBURG, PENNSYLVANIA, ASSIGNOR TO THE NATIONAL TUBE COMPANY, OF SAME PLACE AND NEW YORK, N. Y.

BAR FOR FORMING WELDED RINGS.

SPECIFICATION forming part of Letters Patent No. 653,901, dated July 17, 1900.

Application filed October 14, 1899. Serial No. 733,548. (No model.)

*To all whom it may concern:*

Be it known that I, THOMAS J. BRAY, a resident of Pittsburg, in the county of Allegheny and State of Pennsylvania, have invented a new and useful Improvement in Bars for Forming Welded Rings; and I do hereby declare the following to be a full, clear, and exact description thereof.

My invention relates to bars for the formation of rings, bands, collars, pipe-couplings, thread-protectors, or like articles, its object being to provide a bar from which a number of such rings can be formed at one operation, while the work to be performed by the dies or other welding means employed is reduced to a minimum.

It consists, generally stated, in a bar for forming tube-couplings and like welded rings having a width equal to the length of two or more of such rings and composed of two or more thick bar portions, each corresponding in length to the length of a finished ring to be formed, such bar portions being connected by thin webs corresponding approximately in thickness to the depth of the thread to be cut in the finished ring, so that in the subsequent welding of the blank formed from the bar the necessity for any great forging or shaping during the welding operation is overcome.

To enable others skilled in the art to make and use my invention, I will describe the same more fully, referring to the accompanying drawings, in which—

Figure 1 is a perspective view of one form of bar, such as a bar for forming a number of short rings. Fig. 2 is a like view of a bar suitable for forming pipe-couplings or like collars or bands. Fig. 3 is a view of the blank formed from the bar and bent into shape for welding. Fig. 4 is a view of the hammer-dies, showing the welding of the blanks; and Fig. 5 is a view of the welded blank produced in the dies.

Like numerals indicate like parts in each view.

The bars embodying the invention are rolled to shape in rolls suitable for that purpose and are produced in the ordinary rolling of the bars, so that they can be produced at no extra cost over the ordinary bar of the same thickness throughout. The bars are composed of a number of thick portions 1, corresponding in thickness to the rings or bands to be produced, these thick portions being connected by thin webs 2, these webs corresponding approximately in thickness to the depth of thread to be formed in the finished rings, so that they can be cut apart in the subsequent threading operation or will require but little pressure of the rolls to separate them into a series of rings, if so desired, and it is preferred that in the rolling operation the bars shall be made to conform as far as practicable to the shape of the finished rings or bands—for example, one face of the bar being made flat, while the other face has the depressions 3 above the thin webs 2, the edges of such depressions being curved or rounded, as at 4, corresponding to the edges of the finished rings or bands. These bars can be produced at practically the same cost as the ordinary bars of the same thickness throughout. After the formation of the bars they are employed for making rings or bands in the following way: The bars are cut into blanks of the proper length for forming the rings or bands, it being preferred that the blanks shall be cut with scarfed edges, as at 5, and they may then be bent and welded to shape, being either bent prior to heating and welding or the flat blanks first being heated and then bent and welded at the same time. For this purpose any suitable rolls or dies may be employed—such, for example, as the hammer-dies 6 7, such hammer-dies having concave faces and being provided with annular projections 8, corresponding to the depressions of the bar, so that in the welding operation these projections will fit in the depressions 3 of the bar, and the only work to be performed in the welding operation is to weld together the edges of the rings formed from the bar without the necessity of forming such depressions in the welding operation. The blanks are welded over a suitable mandrel 9, and the rings or bands can either be separated from each other in the welding operation or the blanks welded together while still connected by the thin web portions 2 and the welded blanks so obtained be separated into rings or bands, such as in the subsequent threading of the same in forming pipe-couplings or pipethread protectors, the welded blanks being fed to the threading-dies while connected together and the threading of the blanks cutting them apart.

What I claim as my invention, and desire to secure by Letters Patent, is—

A wrought-metal bar for forming pipe-couplings and like welded rings, having a width equal to the length of two or more such rings and composed of two or more thick bar portions, each corresponding in width to the length of a finished ring to be formed, such bar portions being connected by thin web portions corresponding approximately in thickness to the depth of thread to be cut in the finished ring, substantially as set forth.

In testimony whereof I, the said THOMAS J. BRAY, have hereunto set my hand.

THOMAS J. BRAY.

Witnesses:
GRACE C. RAYMOND.
ROBERT C. TOTTEN.